United States Patent [19]

Ellis et al.

[11] Patent Number: 4,686,267

[45] Date of Patent: Aug. 11, 1987

[54] FLUORINE CONTAINING POLYMERIC COMPOSITIONS USEFUL IN CONTACT LENSES

[75] Inventors: Edward J. Ellis; Jeanne Y. Ellis, both of Lynnfield, Mass.

[73] Assignee: Polymer Technology Corporation, Wilmington, Mass.

[21] Appl. No.: 786,846

[22] Filed: Oct. 11, 1985

[51] Int. Cl.[4] ............................................. C08F 30/08
[52] U.S. Cl. ................................. 526/245; 526/246; 351/160 R; 351/160 H
[58] Field of Search .......................... 526/245, 246; 351/160 R, 160 H

[56] References Cited

U.S. PATENT DOCUMENTS 3,671,574 6/1972 Knell et al. ...................... 526/245
4,440,918 4/1984 Rice et al. ....................... 526/246
4,602,074 7/1986 Mizutani .......................... 526/245
4,625,007 11/1986 Ellis et al. ....................... 351/160 R Primary Examiner—Paul R. Michl
Assistant Examiner—Peter D. Mulcahy
Attorney, Agent, or Firm—Wolf, Greenfield & Sacks

[57] ABSTRACT

Improved contact lens compositions are achieved through incorporation of a fluorine containing mono or diester of itaconic acid in siloxane polymeric contact lens compositions. Copolymers include components which modify contact lens mechanical, optical and transport properties as well as surface characteristics to achieve at least some compositions having an oxygen permeability of at least DK35 with a refractive index of from 1.35 to 1.5 and a percent hydration below 2 percent of total weight. Contact lenses made of materials of this invention are highly permeable to oxygen and resistant to the deposition of tear components providing extended wear capability through improved biocompatibility.

29 Claims, No Drawings

FLUORINE CONTAINING POLYMERIC COMPOSITIONS USEFUL IN CONTACT LENSES

BACKGROUND OF THE INVENTION

Various polymeric hard gas permeable contact lenses are known. Siloxane based materials often are prepared by copolymerization of a siloxanyl alkyl ester of methacrylic acid with other acrylate or methacrylate monomers in many known formulations. Such compositions can exhibit excellent oxygen permeability but often have less than desired biocompatibility sometimes due to their hydrophobic nature.

The art has attempted to impart hydrophilic properties to such siloxane systems through the incorporation of wetting agents or surface modification of finished lenses. Certain wetting agents can lead to accumulation of proteinaceous matter from tear fluid which can result in decreased transparency and wearer discomfort. Surface modification or treatment can also increase wettability but often such treatments are subject to lack of permanence.

The art has recognized that introducing fluorine-containing groups into contact lens polymers can significantly increase oxygen permeability. Contact lens compositions based on fluoroalkylacrylates or methacrylates are known to the art. These materials range from soft to semi-rigid and often require the use of special wetting agents or surface treatments.

Contact lenses based on telechelic perfluorinated polyethers have recently been made public. Such lenses are reported to be highly oxygen permeable and resistant to adsorption of tear components but can be relatively soft making it difficult to use conventional machining techniques known to the art.

Polymeric compositions containing both organosiloxane and fluorinated components are also known. U.S. Pat. No. 4,433,125 discloses copolymers formed of polymerizable organosiloxanes and fluoroalkylacrylates and methacrylates. Some of the materials disclosed have high oxygen permeability but are not believed to simultaneously exhibit levels of hardness desired to fully exploit the advantages of rigid hard gas permeable contact lenses.

Other prior art as in U.S. Pat. No. 4,486,577 has sought to find specific polysiloxanes which are particularly suitable for use in contact lenses. In some cases such as in U.S. Pat. No. 4,486,577, where a specifically designed polysiloxane found to be suitable for contact lens use is disclosed, the developers have indicated that various compounding comonomers can be used including fluoro-containing materials such as itaconates. However, such prior art has not recognized that known and commercially used organosiloxanes in various combinations can have their oxygen permeability increased in contact lens formulations by the addition of fluorinated itaconates.

For example, one particularly well known formulation for contact lens use is that found in U.S. Pat. No. 4,152,508 where various esters of itaconates have been shown to be useful in providing desirable contact lens properties with desired low hydration values and high oxygen permeability coupled with excellent wetting properties and good hardness and dimensional stability. However, oxygen permeability of such materials has often been limited to a value less than DK35.

SUMMARY OF THE INVENTION

The present invention is related to improved contact lenses and the polymeric compositions for producing such lenses.

It is an object of this invention to provide contact lenses and contact lens compositions which incorporate a fluorine containing mono or diester of itaconic acid.

It is also an object of this invention to provide contact lenses and contact lens compositions which are highly permeable to oxygen and resistant to the deposition of tear components.

Another object of this invention is to provide improved contact lenses and contact lens compositions comprising a copolymer of an ethylenically unsaturated organosiloxane and a fluorine containing ester derivative of itaconic acid.

A further object of this invention is to provide contact lenses and contact lens compositions, in accordance with the previous objectives, wherein additional components are included to impart or modify certain bulk material and contact lens properties such as oxygen permeability, rigidity, wettability, biocompatibility, durability, dimensional stability and refractive index.

It is still a further object of this invention to provide new contact lens compositions which can be used as high refractive index components of composite lenses.

According to the invention an oxygen permeable, dimensionally stable, wettable, contact lens material of high transparency comprises a polymer formed by free radical polymerization from (A) and (B) where:

(A) is 5 to 60% by weight of a fluorine containing itaconate mono or diester having the structure:

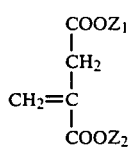

wherein:
$Z_1$ and $Z_2$ can be hydrogen or an organic group with at least one of $Z_1$ or $Z_2$ containing fluorine.

Preferably $Z_1$ and $Z_2$ can be the same or different and are each of a group selected from among the following with at least one of $Z_1$ or $Z_2$ containing fluorine:

hydrogen, straight chain alkyl groups or fluoro substituted alkyl groups containing from 1 to 18 carbon atoms, branched chain alkyl groups or fluoro substituted alkyl groups containing from 4 to 18 carbon atoms, cyclic alkyl groups or fluoro substituted cyclic alkyl groups containing from 5 to 18 carbon atoms, alkyene groups or fluoro substituted alkyene groups containing from 2 to 6 carbon atoms, phenyl groups and fluoro substituted phenyl groups, benzyl and fluoro substituted benzyl groups, phenethyl and fluoro substituted phenethyl groups, ether and polyether groups of the general structure

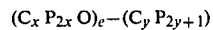

wherein:
"P" is hydrogen or fluorine
"x" is an integer from 2 to 4
"y" is an integer from 1 to 10
"e" is an integer from 1 to 10, (B) is 95 to 40% by weight of at least one organic comonomer of an ethylenically unsaturated organosiloxane having the following formula:

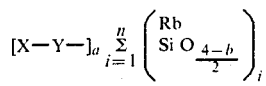

wherein:
"X" is an ethylenically unsaturated group selected from the group consisting of vinyl, acryloxy, methacryloxy, vinyloxy, and carbovinyloxy,
"Y" represents no group or is selected from the group consisting of a divalent alkane radical having from 1 to 10 carbon atoms, a divalent alkene radical having 2 to 10 carbon atoms, a divalent alkane radical containing internal glycol or glycerol segments or a phenylene radical,
"a" is an integer from 1 to 10,
"n" is an integer from 2 to 30,
"b" is an integer from 0 to 3 and may be the same or different within each "i" moiety.
"R" is selected from the class consisting of hydrogen, hydroxy, alkoxy, carboalkoxy, alkyl and substituted alkyl groups containing from 1 to 20 carbon atoms, cyclic alkyl or substituted cyclic alkyl groups containing from 5 to 10 carbon atoms, alkylene groups containing from 2 to 6 carbon atoms, phenyl and substituted phenyl groups, benzyl and substituted benzyl groups and phenethyl and substituted phenethyl groups. "R" and "b" may be the same or different within each "i" moiety.

The contact lens materials and lenses made therefrom may be flexible, semi rigid or hard and preferably have an oxygen permeability of at least DK35 with a refractive index of from 1.35 to 1.5 and a percent hydration below 2% of total weight.

Preferably, the organosiloxane monomer and the fluorine containing itaconate mono or diester monomers are further admixed with one or more of:
(C) 0 to 55% by weight of the entire composition of a vinyl monomer which acts as a hardness modifying agent.
(D) 0 to 55% by weight of the entire composition of a hydrophilic organic monomer to enhance wettability and biocompatibility,
(E) 0 to 20% by weight of the entire composition of a non-siloxane containing crosslinking monomer to improve mechanical properties and dimensional stability.

More preferably (D) is made up of hydrophilic neutral monomers; hydrophilic cationic monomers and hydrophilic anionic monomers and/or a mixture of these. The hydrophilic monomers may be chosen from the classes of acrylic acid, methacrylic acid, and hydrophilic acrylates, methacrylates, itaconates, acrylamides, methacrylamides, vinyl pyrrolidone, and vinyl lactams. Further (C) is a monomer selected from the class consisting of esters of acrylic acid, methacrylic acid and itaconic acid.

The mechanical properties and dimensional stability of the compositions and contact lens described in this invention may be improved through the incorporation of a crosslinking agent (E). Useful crosslinking monomers include polyfunctional derivatives of acrylic acid, methacrylic acid, acrylamide, methacrylamide, and multi-vinyl substituted benzene.

Most preferably a hydrophilic monomer and a crosslinking monomer are used with components (A) and (B).

In some cases contact lenses with high refractive indices (i.e. from 1.5 or greater as for example 1.65) are desirable from a lens design standpoint. Additionally, a high refractive index material is preferred when constructing a segmented bifocal lens. The refractive index of the compositions of this invention may be increased through incorporation of certain comonomers. Preferably, these monomers contain aromatic substitutants and can be selected from among styryls, vinyl naphthyls, arylacrylates, arylmethacrylates and arylitaconates. These materials can be used in amounts as needed in each combination of this invention to increase refractive index to the value desired.

In the most preferred use of materials of this invention as high refractive index materials as in segments of bifocal lenses, the amount of components (A) and (B) can vary from the ranges given above. When refractive indices of greater than 1.5 are desired components can be used in the following amounts:

(A) from 5 to 60% by weight of a fluorine containing itaconate mono or diester having the structure:

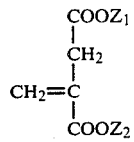

wherein:
$Z_1$ and $Z_2$ can be hydrogen or an organic group with at least one of $Z_1$ or $Z_2$ containing fluorine.

Preferably $Z_1$ and $Z_2$ can be the same or different and are each of a group selected from among the following with at least one of $Z_1$ or $Z_2$ containing fluorine:
hydrogen,
straight chain alkyl groups or fluoro substituted alkyl groups containing from 1 to 18 carbon atoms,
branched chain alkyl groups or fluoro substituted alkyl groups containing from 4 to 18 carbon atoms,
cyclic alkyl groups or fluoro substituted cyclic alkyl groups containing from 5 to 18 carbon atoms,
alkyene groups or fluoro substituted alkyene groups containing from 2 to 6 carbon atoms,
phenyl groups and fluoro substituted phenyl groups,
benzyl and fluoro substituted benzyl groups,
phenethyl and fluoro substituted phenethyl groups,
ether and polyether groups of the general structure

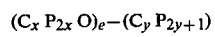

wherein:
"P" is hydrogen or fluorine
"x" is an integer from 2 to 4
"y" is an integer from 1 to 10
"e" is an integer from 1 to 10,
(B) from 95 to 10% by weight of at least one organic comonomer of an ethylenically unsaturated organosiloxane having the following formula:

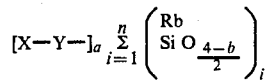

wherein:
"X" is an ethylenically unsaturated group selected from the group consisting of vinyl, acryloxy, methacryloxy, vinyloxy, and carbovinyloxy,
"Y" represents no group or is selected from the group consisting of a divalent alkane radical having from 1 to 10 carbon atoms, a divalent alkene radical having 2 to 10 carbon atoms, a divalent alkane radical containing internal glycol or glycerol segments or a phenylene radical,
"a" is an integer from 1 to 10,
"n" is an integer from 2 to 30,
"b" is an integer from 0 to 3 and may be the same or different within each "i" moiety.
"R" is selected from the class consisting of hydrogen, hydroxy, alkoxy, carboalkoxy, alkyl and substituted alkyl groups containing from 1 to 20 carbon atoms, cyclic alkyl or substituted cyclic alkyl groups containing from 5 to 10 carbon atoms, alkylene groups containing from 2 to 6 carbon atoms, phenyl and substituted phenyl groups, benzyl and substituted benzyl groups and phenethyl and substituted phenethyl groups. "R" and "b" may be the same or different within each "i" moiety.
and (X) from 85 to 20% by weight of a refractive index modifying aromatic group containing monomers such as styryls, vinyl naphthyls, arylacrylates, arylmethacrylates and arylitaconates. Other components such as (C), (D) and (E) may be included in free radically polymerized polymers useful as segment materials of contact lenses. In all cases the D.K. of such materials is at least 10.

It is a feature of this invention that high oxygen permeability values can be obtained in contact lens materials which are also highly resistant to deposition of tear components and which have excellent optical properties. For example, the lenses are highly transparent with good hardness and dimensional stability and can have permeabilities above DK35. In some cases, the materials having refractive indicies above 1.5 can be used as segment materials in bifocal contact lenses.

In preferred embodiments, the hardness modifying agent is preferably present in amounts of from about 10 to about 25 percent, the hydrophilic organic monomer is preferably present in amounts of from about 5 to about 25 percent by weight and the non-siloxane containing crosslinking monomer is preferably present in amounts of from 1 to 10 percent by weight. In the most preferred embodiment the hardness modifying agent is not used.

DESCRIPTION OF PREFERRED EMBODIMENTS

The fluorine containing itaconate mono or diester is preferably used in a range of from 20 to 60 percent by weight of the entire composition although it may range from 50 to 60 percent by weight. The mono or diester can be any within the broad formulations given. Representative fluorine containing mono and diesters of itaconate acid of this invention include:
bis (2,2,2 trifluoroethyl) itaconate
bis (hexafluoroisopropyl) itaconate
bis (1H, 1H - perfluorooctyl) itaconate
bis (1H, 1H, 11H - perfluoroundecyl) itaconate
bis (perfluoro - t butyl) itaconate
bis (pentafluorophenyl) itaconate
bis (2H, 2H - perfluorobenzyl) itaconate
bis (pentafluorophenylmethyl) itaconate
bis (decafluorocyclohexyl) itaconate
bis (1H-perfluorocyclohexyl) methyl itaconate
bis (1,1,1-trifluoroisopropyl) itaconate
1-methyl-4-(hexafluoroisopropyl) monoitaconate
4-(hexafluoroisopropyl) monoitaconate
1-(1H, 1H - perfluorooctyl)-4-hexafluoroisopropyl) itaconate The at least one organic comonomer described above as component (B) which includes an ethylenically unsaturated organosiloxane having the formula noted below is preferably used in amounts of from 95 to 40 percent by weight and more preferably in amounts of from 50 to 80 percent by weight.

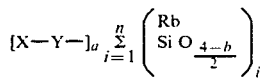

wherein:
"X" the ethylenically unsaturated group is chosen from among:
vinyl
acryloxy
methacryloxy
vinyloxy
carbovinyloxy
"Y" the divalent radical is either no group or
methylene
ethylene
propylene
propenylene
butylene
cyclohexylene
phenylene
—CH₂CH(OH)CH₂OCH₂CH₂CH₂—CH₂CH₂OCH₂CH(OH)CH₂OCH₂CH₂CH₂—
"a" is an integer from 1 to 4
"n" is an integer from 4 to 20
"b" is an integer from 0 to 3 and may be the same or different for each "i" group
"R" may be the same or different within each "i" moiety and is selected from among:
vinyl
methyl
ethyl
propyl
butyl
cyclohexyl
phenyl
2-acetoxyethyl
3-acetoxypropyl
2-(carbomethoxy) ethyl
3-(carbomethoxy) propyl
3 - hydroxypropyl
4 - hydroxybutyl
3,3,3,-trifluoropropyl
3-(heptafluoroisopropoxy) propyl
pentafluorophenyl.

Specific acrylate and methacrylate functional alkyl-/aryl siloxanes as described in the following U.S. patents may also be used as component B:
U.S. Pat. Nos. 3,808,178; 4,120,570; 4,216,303; 4,242,483; 4,248,989; 4,303,772; 4,314,068; 4,139,513; 4,139,692; 4,235,985; 4,153,641; 4,276,402; 4,355,147; 4,152,508; 4,424,328; 4,450,264

Such examples include:

pentamethyldisiloxanylmethyl acrylate and methacrylate
heptamethyltrisiloxanylethyl acrylate and methacrylate
phenyltetramethyldisiloxanylethyl acrylate and methacrylate
triphenyldimethyldisiloxanylmethyl acrylate and methacrylate
isobutylhexamethyltrisiloxanylmethyl acrylate and methacrylate
n-Propyloctamethyltetrasiloxanylpropyl acrylate and methacrylate
methyldi(trimethylsiloxy) silylmethyl acrylate and methacrylate
dimethyl [bis(trimethylsiloxy)methyl siloxanyl] silyl methyl acrylate and methacrylate
dimethyl [tris(trimethylsiloxy) siloxanyl] silylpropyl acrylate or methacrylate
tris(trimethylsiloxy)silylmethyl acrylate and methacrylate
tris(trimethylsiloxy)silylpropyl acrylate and methacrylate
tris(phenyldimethylsiloxy)silylpropyl acrylate and methacrylate
t-Butyldimetylsiloxy[bis(trimethylsiloxy)] silylpropyl acrylate and methacrylate
tris(pentamethyldisiloxanyl) silylpropyl acrylate and methacrylate
tris[tris(trimethylsiloxy)siloxanyl] silylpropyl acrylate and methacrylate
tris[bis(trimethylsiloxy)methylsiloxanyl] silylpropyl acrylate and methacrylate
methylbis (trimethylsiloxy)-silylpropylglycerol acrylate and methacrylate
tris(trimethylsiloxy)silylproplylglycerol acrylate and methacrylate
methylbis(trimethylsiloxy)-silylpropylglycerolethyl acrylate and methacrylate
tris(trimethylsiloxy)silylpropylglyerolethyl acrylate and methacrylate
1,3-bis(methacryloxypropyl) tetrakis (trimethylsiloxy) disiloxane
1,5-bis(methacryloxymethyl)3,3-bis(trimethylsiloxy) tetramethyl trisiloxane
1,3-bis(4-methacryloxybutyl)tetramethyldisiloxane
alpha,omega-bis(4 methacryloxybutyl) polydimethyl siloxane
1,5-bis(methacryloxypropyl) 1,1,5,5 tetrakis (trimethylsiloxy) dimethyltrisiloxane
1,3-bis(methacryloxypropyl)tetrakis[bis (trimethylsiloxy) methylsiloxanyl] disiloxane
1,7-bis(methacryloxypropyl)octa(trimethylsiloxy) tetrasiloxane
tris(methacryloxypropyltetramethyldisiloxanyl) trimethylsiloxysilane
8-(3-hydroxy-4-methacryloxycyclohexyl)ethyltris (trimethylsiloxy)silane
2-hydroxy-4-tris(trimethylsiloxy)silylcyclohexyl methacrylate Acrylate and methacrylate functional, substituted alkyl/aryl siloxanes such as those described in U.S. Pat. No. 4,463,149 can be used as component (B).

Typical examples include:
tris(2-acetoxyethyldimethylsiloxy)silylpropyl acrylate and methacrylate
tris(2-carboxyethyldimethylsiloxy)silylpropyl acrylate and methacrylate
tris(3-hydroxypropyldimethylsiloxy)silylpropyl acrylate and methacrylate Acrylate and methacrylate functional, fluorosubstituted alkyl/aryl siloxanes such as:
tris(3,3,3 trifluoropropyl dimethylsiloxy) silyl propyl acrylate and methacrylate
tris[3-heptafluoroisopropoxy propyl)] dimethysiloxy silylpropyl acrylate and methacrylate
tris(pentafluorophenyl dimethylsiloxy)silyl propyl acrylate and methacrylate Other potentially useful ethylenically unsaturated organosiloxanes include:
p-(pentamethyldisiloxanyl) styrene
bis(trimethylsiloxy) pyrrolidinonyldimethyl siloxy-silylpropyl acrylate and methacrylate The ethylenically unsaturated organosiloxane used or mixture thereof can be a monofunctional organosiloxane. Preferably, however, the organosiloxanes used are mixtures containing multi-functional as well as monofunctional organosiloxanes as set forth in U.S. Pat. No. 4,424,328 issued Jan. 3, 1984. The use of the multifunctional component can provide compositions with increased strength, reduced brittleness while retaining desirable properties of contact lenses. Preferably the organosiloxanes used in the monomeric mixtures of this invention for polymerization include one or more monofunctional organosiloxanes in an amount of from 70 to 95% by weight of the total organosiloxane and one or more multifunctional organosiloxanes in an amount of from about 5 to 30 percent.

Useful multifunctional components can be dimers, trimers or higher functionality organosiloxanes. The terms dimers and trimers are used in the art as recognized usage for difunctional and trifunctional organosiloxane.

Preferably from 0 to 55 percent by weight and more preferably from about 10 to about 25 percent by weight of a comonomer which is a hardness modifying agent selected from the class consisting of esters of acrylic acid, methacrylic acid and itaconic acid having the following structures:

$$[X-Y]_a \sum_{i=1}^{n} \left( \underset{SiO\frac{4-b}{2}}{R_b} \right)_i$$

wherein:
R$_1$, R$_2$, R$_3$, and R$_4$ may be selected from among alkyl and substituted alkyl groups containing from 1 to 20 carbon atoms, cyclic alkyl or substituted cyclic alkyl groups containing from 5 to 10 carbon atoms, phenyl and substituted phenyl groups, benzyl and substituted benzyl groups and phenethyl and substituted phenethyl groups.

Specific comonomers which can be rigidizing or flexibilizing agents can be selected from the class consisting essentially of acrylates, methacrylates and nonfluorinated itaconates.

Specific useful ester derivatives of acrylic, methacrylic and itaconic acid include:
methyl
ethyl
propyl
butyl
pentyl
hexyl
2-ethylhexyl
cyclohexyl ethoxyethyl
tetrahydrofurfuryl
phenyl
isobornyl
adamantanyl
dicylopentadienyl
isopinocamphyl
benzyl From 0 to 55 percent and preferably 5 to 25 percent by weight of a hydrophilic organic monomer is used as a comonomer which imparts wettability and biocompatibility to contact lenses of the formulations of this invention. Hydrophilic cationic monomers, hydrophilic anionic monomers, hydrophilic neutral monomers and mixtures thereof can be used. The hydrophilic monomers preferably chosen from the classes consisting of hydrophilic acrylates, methacrylates, itaconates, acrylamides, methacrylamides and vinyl lactams.

Neutral monomers which impart hydrophilic properties to contact lens materials and contact lenses include:
N-vinylpyrrolidone
acrylamides
methacrylamide
N,N-dimethylacrylamide
2-hydroxyethyl acrylate or methacrylate
2- or 3-hydroxypropyl acrylate or methacrylate
glyceryl acrylate or methacrylate
glycidyl acrylate or methacrylate
3-methoxy-2-hydroxypropyl acrylate or methacrylate
ester derivatives of acrylic, methacrylic and itaconic acid with polyethers of the general formula:

$$HO(C_n H_{2n} O)_x R$$

Wherein "n" is a number from 1 to about 4 and "x" is a number from 2 to about 10 and "R" is hydrogen or a lower alkyl group.

The cationic hydrophilic monomers either can be initially in their charged form or are subsequently converted to their charged form after formation of the contact lens. The classes of these compounds are derived from basic or cationic acrylates, methacrylates, acrylamides, methacrylamides, vinylpyridines, vinylimidazoles, and diallyldialkylammonium polymerizable groups. Such monomers are represented by:
N,N-dimethylaminoethyl acrylate and methacrylate
2-methacryloyloxyethyl trimethyl ammonium chloride and methylsulfate
2-,4-, and 2-methyl-5-vinylpyridine
2-,4-, and 2-methyl-5-vinylpyridinium chloride and methylsufate
N-(3-methacrylamidopropyl)-N,N-dimethylamine
N-(3-methacrylamidopropyl)-N,N,N-trimethyl ammonium chloride
diallyl dimethyl ammonium chloride and methylsulfate The anionic hydrophilic monomers either are in their neutral form initially or are subsequently converted to their anionic form. These classes of compounds include polymerizable monomers which contain carboxy, sulfonate, or phosphate groups. Such monomers are represented by:
acrylic acid
methacrylic acid
sodium acrylate and methacrylate
vinylsulfonic acid
sodium vinylsulfonate
p-styrenesulfonic acid
sodium p-styrenesulfonate
2-methacryloyloxyethylsulfonic acid
3-methacryloyloxy-2-hydroxypropylsulfonic acid
2-acrylamide--methylpropanesulfonic acid
allylsulfonic acid
2-phosphatoethyl methacrylate From 0 to 20 percent and preferably 1 to 10 percent by weight of a non siloxane containing crosslinking monomer can advantageously improve mechanical and dimensional stability properties of the contact lens materials of this invention. Useful crosslinking monomers include polyfunctional derivatives of acrylic acid, methacrylic acid, acrylamide, methacrylamide, and multivinyl substituted benzene.

Such crosslinking comonomers which modifies the mechanical properties and dimensional stability include polyfunctional derivatives of acrylic acid, methacrylic acid, acrylamide, methacrylamide, and multi-vinyl substituted benzene, including buy not limited to, the following:
ethylene glycol diacrylate or dimethacrylate
diethylene glycol diacrylate or dimethacrylate
tetraethylene glycol diacrylate or dimethacrylate
polyethylene glycol diacrylate or dimethacrylate
polypropylene glycol diacrylate or methacrylate
trimethylolpropane triacrylate or trimethacrylate
Bisphenol A diacrylate or dimethacrylate
ethoxylated Bisphenol A diacrylate or dimethacrylate
pentaerythritol tri- and tetraacrylate or methacrylate
tetramethylenediacrylate or dimethacrylate
methylene bisacrylamide or methacrylamide
dimethylene bisacrylamide or methacrylamide
diallyl diglycol carbonate Latent crosslinking agents which are useful include:
glycidyl acrylate and methacrylate
allyl acrylate and methacrylate
N-methylolmethacrylamide
acrylic and methacrylic anhydride Where contact lenses with high refractive indices are desirable or contact lens materials for inclusion in bifocal or other lens combinations are desirable where a high refractive index is acceptable, aromatic containing organic monomers can be added to the monomer mixtures of the present invention. High refractive index materials of this type generally have a refractive index of at least 1.50. The refractive index of any of the compositions of this inventions can be increased through incorporation of such aromatic monomers. Preferably these monomers contain aromatic groups and are selected from among styryls, vinyl naphthyls, arylacrylates, arylmethacrylates and arylitaconates. Such monomers which may increase or decrease hardness can be used in amounts of from 0 to 55 percent.

The copolymers formed in this invention are prepared by free radical polymerization through the incorporation of a free radical initiator. The initiator is chosen from those commonly utilized to polymerize vinyl type monomers and include the following representative initiators:
2,2'-azo-bis-isobutyronitrile
4,4'-azo-bis-(4-cyanopentanoic acid)
t-butyl peroctoate
benzoyl peroxide
lauroyl peroxide
methyl ethyl ketone peroxide diisopropyl peroxydicarbonate
2,2' azobisisovaleronitrile The free radical initiator is normally used in amounts of from 0.01 to 2 percent by weight of the entire composition.

The materials of this invention can be either thermoplastic or thermosetting thus providing latitude in the fabrication of contact lenses. Such materials can be polymerized directly in a suitable mold to form contact lenses.

In the case of rigid composition it is preferred to use the conventional approach when forming contact lenses such as used for polymethyl methacrylate (PMMA). In this approach, the formulations are polymerized directly into a sheet or rod and the contact lens blanks are cut as buttons, discs or other preformed shapes which are then machined to obtain the lens surfaces. The polymeric blanks possess the optical qualities necessary to produce aberration free, oxygen permeable, hard contact lenses in accordance with this invention.

Oxygen permeability (DK) values stated for compositions of this invention were determined on uniform thin disk specimens by the polarographic method (see M. F. Refojo, F. J. Holly and F. L. Leong, "Permeability of Dissolved Oxygen Through Contact Lenses", Contact and Interocular Lens Med. J., 3(4) (1977)27.). This technique utilizes an electrode to measure dissolved oxygen permeabilities at 35° C. in an air saturated environment and the result is expressed in the following units $$DK = \frac{(cm^3 STP) \cdot cm}{cm^2 \cdot sec \cdot cmHg} \times 10^{10}$$

Resistance to the deposition of tear components is determined through empirical comparisons with current siloxanyl acrylate based lens materials.

Wettability of the compositions disclosed in this invention is assessed on the basis of visual observation of water droplet behavior when placed on finely polished flats.

Rockwell hardness is determined following the procedure described in ASTM D-785 utilizing the R-scale.

The following examples are given to illustrate the invention and are not meant to be limiting:

EXAMPLE 1

Preparation of bis(1,1,1,3,3,3-hexafluoro-2-propyl) Itaconate (BHI).

To a stirred suspension of 65.1 g of itaconic acid in 1L of $CH_2Cl_2$ is added 168 g of 1,1,1,3,3,3-hexafluoro-2-propanol. An ice bath is applied and 206 g of N,N'-dicyclohexylcarbodiimide is added at such a rate that the temperature does not exceed 25° C. Stirring is continued for 18 hours and the resultant precipitate filtered off. The filtrate is washed with equal volumes of $NaHCO_3$ solution and water, respectively, and dried. Evaporation and distillation gives 139 g of BHI, $n_D^{24}=1.3370$.

EXAMPLE 2

This example illustrates the preparation of a copolymer of BHI and an organosiloxane exhibiting excellent hardness as well as high oxygen permeability and wettability.

A mixture of 20 parts of BHI, 12.5 parts of methyl methacrylate (MMA), 42 parts tris(trimethylsiloxy) silylpropyl methacrylate (TRIS-M), 13 parts 1,3-bis(methacryloxyoxypropyl) 1,1,3,3-tetrakis (trimethyl siloxy) disiloxane (TRIS-D), 7.5 parts of methacrylic acid (MA), 5 parts of tetraethylene glycol dimethacrylate (TEGDM), 0.18 parts of 2,2'-azobisisobutyronitrile (AIBN) initiator and 0.06 parts of 2,2'-azobisisovaleronitrile (AIVN) is placed in a tube, deoxygenated, sealed from outside air, and polymerized by heating in a water bath at 40° C. for 3 days and further in an oven at 65° C. for 2 days. The resulting copolymer is then subjected to gamma radiation in the presence of an inert atmosphere, to achieve a total dosage of 3.0 Mrads. This material is clear, wettable, and has a Rockwell hardness (R scale) of 117–118. Contact lenses are lathe cut from blanks using techniques well known to the art and have an oxygen permeability of DK55 and a refractive index of 1.44 at 21° C. Such lenses are transparent, dimensionally stable and exhibit good resistance to tear component deposits.

EXAMPLE 3

This example illustrates the preparation of a copolymer of BHI exhibiting very high oxygen permeability as well as good hardness and wettability.

A mixture of 32 parts of comonomer BHI, 42 parts TRIS-M, 14 parts TRIS-D, 5 parts of MA, 5 parts of N-vinylpyrrolidone, 2.5 parts of TEGDM, 0.18 parts of AIBN, and 0.06 parts of AIVN is polymerized and gamma irradiated essentially as in Example 2. The resulting material is clear, wettable, machinable, and has a Rockwell hardness (R scale) of 108. Contact lenses generated from this composition have an oxygen permeability of DK94.

EXAMPLE 4

This example illustrates the preparation of a copolymer of BHI exhibiting high refractive index as well as good machinability and permeability.

A mixture of 9 parts of comonomer BHI, 15 parts TRIS-M, 3 parts TRIS-D, 40 parts styrene, 30 parts of beta-naphthyl methacrylate, 3 parts TEGDM, 0.3 parts of AIBN, and material is polymerized and gamma irradiated by the technique of Example 2. The resulting material has a Rockwell (R scale) hardness of 122 and is readily machinable by lathe techniques. Contact lenses generated from this composition have a refractive index of 1.55 and an oxygen permeability of DK15.

EXAMPLE 5

This example illustrates the preparation of a copolymer of bis (1,1-Dihydroperfluoroethyl) itaconate (BEI) exhibiting excellent hardness as well as high oxygen permeability and wettability.

A mixture of 20 parts BEI, 7.5 parts N-vinylpyrrolidone, 45 parts TRIS-M, 15 parts TRIS-D, 10 parts of methacrylic acid (MA), 2.5 parts of tetraethylene glycol dimethacrylate (TEGDM), 0.20 parts of 2,2'-azobisisobutyronitrile (AIBN) and 0.10 parts of 2,2-azobisisovaleronitrile (AIVN) is polymerized and gamma irradiated by this technique of Example 2. The resulting polymeric material is clear, wettable, and has a Rockwell hardness (R scale) of 114. Contact lenses generated from this composition have an oxygen permeability of DK50 and exhibit good resistance to tear component deposits.

Another contact lens material in accordance with the present invention is formed from polymerization of a monomeric mixture of bis(1,1,1,3,3,3-hexafluoro-2-propyl) itaconate, bis(methacryloxypropyl)1,1,3,3,3-tetrakis (trimethyl siloxy) disiloxane, tris(trimethylsiloxy)

silylpropyl methacrylate, methylmethacrylate, n-vinyl pyrrolidone, methacrylic acid and tetraethylene glycol dimethacrylate.

The fluorine itaconate containing siloxane polymeric compositions of this invention can have conventional additives incorporated therein as known in the art. In all cases the polymers are optically clear and meet required standards of contact lenses. Additives such as from 0.1 to 2 percent by weight of conventional colorants, ultraviolet absorbers and tints such as D & C green number 6 can be used. In all cases, the fluorinated itaconate ester used enables one to obtain a high oxygen permeability value with good optical clarity, a desirable hardness value, good dimensional stability and good tear component deposit resistance. The oxygen permeability of the lenses of this invention is preferably in the range of from at least DK35 to DK100 or greater. The hardness values of the lenses are preferably a minimum of 90 Rockwell R Scale or above.

While we have described specific examples of this invention, many variations are possible within the scope of keeping the physical properties as described above. Such variations include the use of mixtures of monomers within components such as (A), (B), (C), (D) and (E) above, to make up the required percentages of each. For example, two or more siloxanyl alkyl ester monomers can be used instead of a single such monomer for that component of the system. Similarly, two or more crosslinking agents can be used. Conventional additives to the lens compositions such as colorants, tints and the like may also be employed within the normal ranges for such materials.

We claim:

1. An oxygen permeable dimensionally stable, hydrophilic, contact lens material of high transparency, comprising a polymer formed by free radical polymerization from
   (A) 5 to 60% by weight of a fluorine containing itaconate mono or diester having the structure:

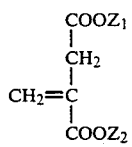

wherein:
$Z_1$ and $Z_2$ can be the same or different and are each of a group selected from among the following with at least one of $Z_1$ or $Z_2$ containing fluorine: hydrogen,
   straight chain alkyl groups or fluoro substituted alkyl groups containing from 1 to 18 carbon atoms,
   branched chain alkyl groups or fluoro substituted alkyl groups containing from 4 to 18 carbon atoms,
   cyclic alkyl groups or fluoro substituted cyclic alkyl groups containing from 5 to 18 carbon atoms,
   phenyl groups and fluoro substituted phenyl groups, or
   benzyl and fluoro substituted benzyl groups, phenethyl and fluoro substituted phenethyl groups,
   ethers and polyethers of the general structure

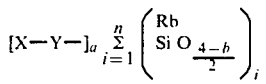

wherein:
"P" is hydrogen or fluorine
"x" is an integer from 1 to 4
"y" is an integer from 1 to 10
"e" is an integer from 1 to 10,
(B) 95 to 40% by weight of at least one organic comonomer of an ethylenically unsaturated organosiloxane having the following formula:

$$[X-Y-]_a \sum_{i=1}^{n} \left( \begin{array}{c} R^b \\ Si\ O_{\frac{4-b}{2}} \end{array} \right)_i$$

wherein:
"X" is an ethylenically unsaturated group selected from the group consisting of vinyl, acryloxy, methacryloxy, vinyloxy, and carbovinyloxy,
"Y" represents no group or is selected from the group consisting of a divalent alkane radical having from 1 to 10 carbon atoms, a divalent alkene radical having 2 to 10 carbon atoms and a phenylene radical,
"a" is an integer from 1 to 10,
"n" is an integer from 2 to 30,
"b" is an integer from 0 to 3 and may be the same or different within each "i" moiety,
"R" is selected from the class consisting of hydrogen, hydroxy, alkoxy, carboalkoxy, alkyl and substituted alkyl groups containing from 1 to 20 carbon atoms, cyclic alkyl or substituted cyclic alkyl groups containing from 5 to 10 carbon atoms, phenyl and substituted phenyl groups, benzyl and substituted benzyl groups and phenethyl and substituted phenethyl groups "R" and "b" may be the same or different within each "i" moiety.

2. A contact lens material in accordance with claim 1 wherein said material has an oxygen permeability of at least DK35 with a refractive index of from 1.35 to 1.5 and a percent hydration below 2% of total weight.

3. An oxygen permeable dimensionally stable hydrophilic, contact lens material of high transparency, comprising a polymer formed by free radical polymerization from
   (A) 5 to 60% by weight of a fluorine containing itaconate mono or diester having the structure:

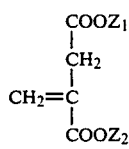

wherein:
$Z_1$ and $Z_2$ can be the same or different and are each of a group selected from among the following with at least one of $Z_1$ or $Z_2$ containing fluorine: hydrogen,
   straight chain alkyl groups or fluoro substituted alkyl groups containing from 1 to 18 carbon atoms,
   branched chain alkyl groups or fluoro substituted alkyl groups containing from 4 to 18 carbon atoms cyclic alkyl groups or fluoro substituted cyclic alkyl groups containing from 5 to 18 carbon atoms, phenyl groups and fluoro substituted phenyl groups, or benzyl and fluoro substituted benzyl groups, phenethyl and fluoro substituted phenethyl groups, ethers and polyethers of the general structure $(C_xP_{2x}O)_e-(C_yP_{2y+1})$ wherein:
"P" is hydrogen or fluorine
"x" is an integer from 1 to 4
"y" is an integer from 1 to 10
"e" is an integer from 1 to 10, (B) from 95 to 40% by weight of at least one ethylenically unsaturated organosiloxane having the following formula:

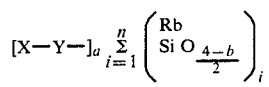

wherein:
"X" is an ethylenically unsaturated group selected from the group consisting of vinyl, acryloxy, methacryloxy, vinyloxy, and carbovinyloxy, "Y" represents no group or is selected from the group consisting of a divalent alkane radical having from 1 to 10 carbon atoms, a divalent alkene radical having 2 to 10 carbon atoms and a phenylene radical, "a" is an integer from 1 to 10,
"n" is an integer from 2 to 30,
"b" is an integer from 0 to 3 and may be the same or different within each "i" moiety, "R" is selected from the class consisting of hydrogen, hydroxy, alkoxy, carboalkoxy, alkyl and substituted alkyl groups containing from 1 to 20 carbon atoms, cyclic alkyl or substituted cyclic alkyl groups containing from 5 to 10 carbon atoms, phenyl and substituted phenyl groups, benzyl and substituted benzyl groups and phenethyl and substituted phenethyl groups, "R" and "b" may be the same or different within each "i" moiety, (C) 0 to 55% by weight of the entire composition of a vinyl monomer hardness modifying agent, (D) 0 to 55% by weight of the entire composition of a hydrophilic organic monomer, (E) 0 to 20% by weight of the entire composition of a non-siloxane containing cross-linking monomer.

4. A contact lens material in accordance with claim 1 and further comprising an aromatic containing organic vinyl monomer and a refractive index of at least 1.5.

5. A contact lens material in accordance with claim 3 wherein said hardness modifying agent is selected from the class consisting of esters of acrylic acid, methacrylic acid and itaconic acid.

6. A contact lens material in accordance with claim 1 wherein from 5 to 30% of said ethylenically unsaturated organosiloxanes are multifunctional, unsaturated organosiloxanes.

7. A contact lens material in accordance with claim 1 and further comprising from about 5 to about 25% by weight of a hydrophilic organic monomer.

8. A contact lens material in accordance with claim 1 and further comprising from about 1 to about 10% by weight of a non-siloxane containing crosslinking monomer.

9. A contact lens material in accordance with claim 1 and further comprising from about 10 to about 25% by weight of a hardness modifying agent.

10. A contact lens material in accordance with claim 1 wherein $Z_1$ is hydrogen and $Z_2$ is a fluorinated alkyl group having from 1 to 8 carbon atoms.

11. A contact lens material in accordance with claim 1 wherein $Z_1$ and $Z_2$ are fluorinated alkyl groups having from 1 to 8 carbon atoms.

12. A contact lens material in accordance with claim 3 wherein said hardness modifying agent is not present and said hydrophilic organic monomer and non-siloxane containing crosslinking monomer are present.

13. A contact lens material in accordance with claim 3 wherein $Z_1$ and $Z_2$ are fluorinated alkyl groups containing from 1 to 8 carbon atoms.

14. A contact lens material in accordance with claim 1 wherein said fluorine containing itaconate diester is bis(1,1,1,3,3,3-hexafluoro-2-propyl) itaconate.

15. An oxygen permeable dimensionally stable hydrophilic contact lens material in accordance with claim 3 wherein said organosiloxane is tris(trimethylsiloxy) silylpropyl methacrylate admixed with 1,3-bis(methacryloxypropyl)1,1,3,3-tetrakis (trimethyl siloxy) disiloxane.

16. A contact lens material formed from polymerization of a monomeric mixture of bis(1,1,1,3,3,3-hexafluoro-2-propyl) itaconate, bis(methacryloxypropyl)1,1,3,3-tetrakis (trimethyl siloxy) disiloxane, tris(trimethylsiloxy) ilylpropyl methacrylate, methylmethacrylate, n-vinyl pyrrolidone, methacrylic acid and tetraethylene glycol dimethacrylate.

17. A contact material in accordance with claim 3 wherein said hydrophilic organic monomer is present and is selected from the class consisting of acrylic acid, methacrylic acid, and monoesters of itaconic acid.

18. A contact lens formed from an oxygen permeable dimensionally stable, hydrophilic, contact lens material of high transparency, comprising a polymer formed by free radical polymerization from
(A) 5 to 60% by weight of a fluorine containing itaconate mono or diester having the structure:

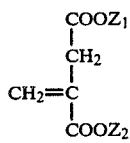

wherein:
$Z_1$ and $Z_2$ can be the same or different and are each of a group selected from among the following with at least one of $Z_1$ or $Z_2$ containing fluorine:
hydrogen,
straight chain alkyl groups or fluoro substituted alkyl groups containing from 1 to 18 carbon atoms,
branched chain alkyl groups or fluoro substituted alkyl groups containing from 4 to 18 carbon atoms, cyclic alkyl groups or fluoro substituted cyclic alkyl groups containing from 5 to 18 carbon atoms, phenyl groups and fluoro substituted phenyl groups, or benzyl and fluoro substituted benzyl groups, phenethyl and fluoro substituted phenethyl groups, ethers and polyethers of the general structure $$(C_x P_{2x}O)_e-(C_y P_{2y+1})$$

wherein:
"P" is hydrogen or fluorine
"x" is an integer from 1 to 4
"y" is an integer from 1 to 10
"e" is an integer from 1 to 10, (B) 95 to 40% by weight of at least one organic comonomer of an ethylenically unsaturated organosiloxane having the following formula:

wherein:
"X" is an ethylenically unsaturated group selected from the group consisting of vinyl, acryloxy, methacryloxy and vinyloxy, and carbovinyloxy, "Y" represents no group or is selected from the group consisting of a divalent alkane radical having from 1 to 10 carbon atoms, a divalent alkene radical having 2 to 10 carbon atoms, and a phenylene radical, "a" is an integer from 1 to 10,
"n" is an integer from 2 to 30,
"b" is an integer from 0 to 3 and may be the same or different within each "i" moiety "R" is selected from the class consisting of hydrogen, hydroxy, alkoxy, carboalkoxy, alkyl and substituted alkyl groups containing from 1 to 20 carbon atoms, cyclic alkyl or substituted cyclic alkyl groups containing from 5 to 10 carbon atoms, phenyl and substituted phenyl groups, benzyl and substituted benzyl groups and phenethyl and substituted phenethyl groups "R" and "b" may be the same or different within each "i" moiety.

19. A contact lens formed from a contact lens material in accordance with claim 18 wherein said material has an oxygen permeability of at least DK35 with a refractive index of from 1.35 to 1.5 and a percent hydration below 2% of total weight.

20. A contact lens formed from an oxygen permeable dimensionally stable hydrophilic, contact lens material of high transparency, comprising a polymer formed by free radical polymerization from (A) 5 to 60% by weight of a fluorine containing itaconate mono or diester having the structure:

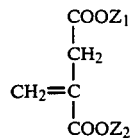

wherein:
$Z_1$ and $Z_2$ can be the same or different and are each of a group selected from among the following with at least one of $Z_1$ or $Z_2$ containing fluorine:
hydrogen,
straight chain alkyl groups or fluoro substituted alkyl groups containing from 1 to 18 carbon atoms, branched chain alkyl groups or fluoro substituted alkyl groups containing from 4 to 18 carbon atoms cyclic alkyl groups or fluoro substituted cyclic alkyl groups containing from 5 to 18 carbon atoms, phenyl groups and fluoro substituted phenyl groups, or benzyl and fluoro substituted benzyl groups, phenethyl and fluoro substituted phenethyl groups, ethers and polyethers of the general structure $$(C_x P_{2x}O)_e-(C_y P_{2y+1})$$

wherein:
"P" is hydrogen or fluorine
"x" is an integer from 1 to 4
"y" is an integer from 1 to 10
"e" is an integer from 1 to 10, (B) from 30 to 95% by weight of at least one ethylenically unsaturated organosiloxane having the following formula:

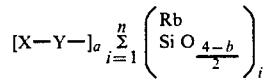

wherein:
"X" is an ethylenically unsaturated group selected from the group consisting of vinyl, acryloxy, methacryloxy and vinyloxy, and carbovinyloxy, "Y" represents no group or is selected from the group consisting of a divalent alkane radical having from 1 to 10 carbon atoms, a divalent alkene radical having 2 to 10 carbon atoms, and a phenylene radical, "a" is an integer from 1 to 10,
"n" is an integer from 2 to 30,
"b" is an integer from 0 to 3 and may be the same or different within each "i" moiety, "R" is selected from the class consisting of hydrogen, hydroxy, alkoxy, carboalkoxy, chain alkyl and substituted alkyl groups containing from 1 to 20 carbon atoms, cyclic alkyl or substituted cyclic alkyl groups containing from 5 to 10 carbon atoms, phenyl and substituted phenyl groups, benzyl and substituted benzyl groups and phenethyl and substituted phenethyl groups "R" and "b" may be the same or different within each "i" moiety, (C) 0 to 55% by weight of the entire composition of a vinyl monomer modifying agent, (D) 0 to 55% by weight of the entire composition of a hydrophilic organic monomer, (E) 0 to 20% by weight of the entire composition of a non-siloxane containing cross-linking monomer.

21. A contact lens formed from a contact lens material in accordance with claim 18 and further comprising an aromatic containing organic vinyl monomer and a refractive index of at least 1.5.

22. An oxygen permeable dimensionally stable, hydrophilic, contact lens material of high transparency, comprising a polymer formed by free radical polymerization from:

(A) 5 to 60% by weight of a fluorine containing itaconate mono or diester having the structure:

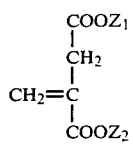

wherein:

$Z_1$ and $Z_2$ can be hydrogen or an organic group with at least one of $Z_1$ or $Z_2$ containing fluorine, (B) 95 to 40% by weight of at least one organic comonomer of an ethylenically unsaturated organosiloxane having the following formula:

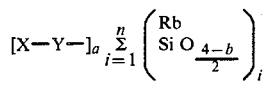

wherein:

"X" is an ethylenically unsaturated group selected from the group consisting of vinyl, acryloxy, methacryloxy, vinyloxy, and carbovinyloxy, "Y" represents no group or is selected from the group consisting of a divalent alkane radical havng from 1 to 10 carbon atoms, a divalent alkene radical having 2 to 10 carbon atoms, or a phenylene radical, "a" is an integer from 1 to 10, "n" is an integer from 2 to 30, "b" is an integer from 0 to 3 and may be the same or different within each "i" moiety, "R" is selected from the class consisting of hydrogen, hydroxy, alkoxy, carboalkoxy, alkyl and substituted alkyl groups containing from 1 to 20 carbon atoms, cyclic alkyl or substituted cyclic alkyl groups containing from 5 to 10 carbon atoms, phenyl and substituted phenyl groups, benzyl and substituted benzyl groups and phenethyl and substituted phenethyl groups, "R" and "b" may be the same or different within each "i" moiety.

23. The material of claim 1 in the form of a contact lens.

24. An oxygen permeable contact lens material of high transparency comprised of a polymer formed by free radical polymerization from (A) 5 to 60% by weight of a fluorine containing itaconate mono or diester having a structure:

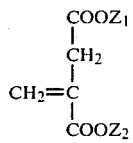

wherein:

$Z_1$ and $Z_2$ can be hydrogen or an organic group with at least one of $Z_1$ or $Z_2$ containing fluorine, (B) 95 to 10% by weight of at least one organic comonomer of an ethylenically unsaturated organosiloxane having the following formula:

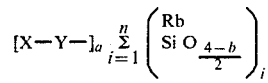

wherein:

"X" is an ethylenically unsaturated group selected from the group consisting of vinyl, acryloxy, methacryloxy, vinyloxy, and carbovinyloxy, "Y" represents no group or is selected from the group consisting of a divalent alkane radical having from 1 to 10 carbon atoms, a divalent alkene radical having 2 to 10 carbon atoms, or a phenylene radical, "a" is an integer from 1 to 10, "n" is an integer from 2 to 30, "b" is an integer from 0 to 3 and may be the same or different within each "i" moiety, "R" is selected from the class consisting of hydrogen, hydroxy, alkoxy, carboalkoxy, alkyl and substituted alkyl groups containing from 1 to 20 carbon atoms, cyclic alkyl or substituted cyclic alkyl groups containing from 5 to 10 carbon atoms, phenyl and substituted phenyl groups, benzyl and substituted benzyl groups and phenethyl and substituted phenethyl groups, "R" and "b" may be the same or different within each "i" moiety and (C) from 85 to 20% by weight of a refractive index modifying aromatic group containing monomer.

25. A contact lens material in accordance with claim 24 wherein said aromatic group containing monomer is selected from the class consisting of styryls, vinyl naphthyls, arylacrylates, arylmethacrylates and arylitaconates and mixtures thereof.

26. A contact lens material in accordance with claim 24 wherein said contact lens material has a refractive index of at least 1.5 and a DK of at least 10.

27. Bis(1,1,1.3,3,3-hexafluoro-2-propyl) itaconate.

28. A contact lens material formed from polymerization of a monomeric mixture of bis(1,1,1,3,3,3-hexafluoro-2-propyl) itaconate, bis(methacryloxypropyl)1,1,3,3-tetrakis (trimethyl siloxy) disiloxane, tris(trimethylsiloxy) silylpropyl methacrylate, n-vinyl pyrrolidone, methacrylic acid and tetraethylene glycol dimethacrylate.

29. A contact lens material formed from polymerization of a monomeric mixture of bis(1,1,1,3,3,3-hexafluoro-2-propyl) itaconate, bis(methacryloxypropyl)1,1,3,3-tetrakis (trimethyl siloxy) disiloxane, tris(trimethylsiloxy) silylpropyl methacrylate, methylmethacrylate, methacrylic acid and tetraethylene glycol dimethacrylate.

* * * * *